No. 791,251. Patented May 30, 1905.

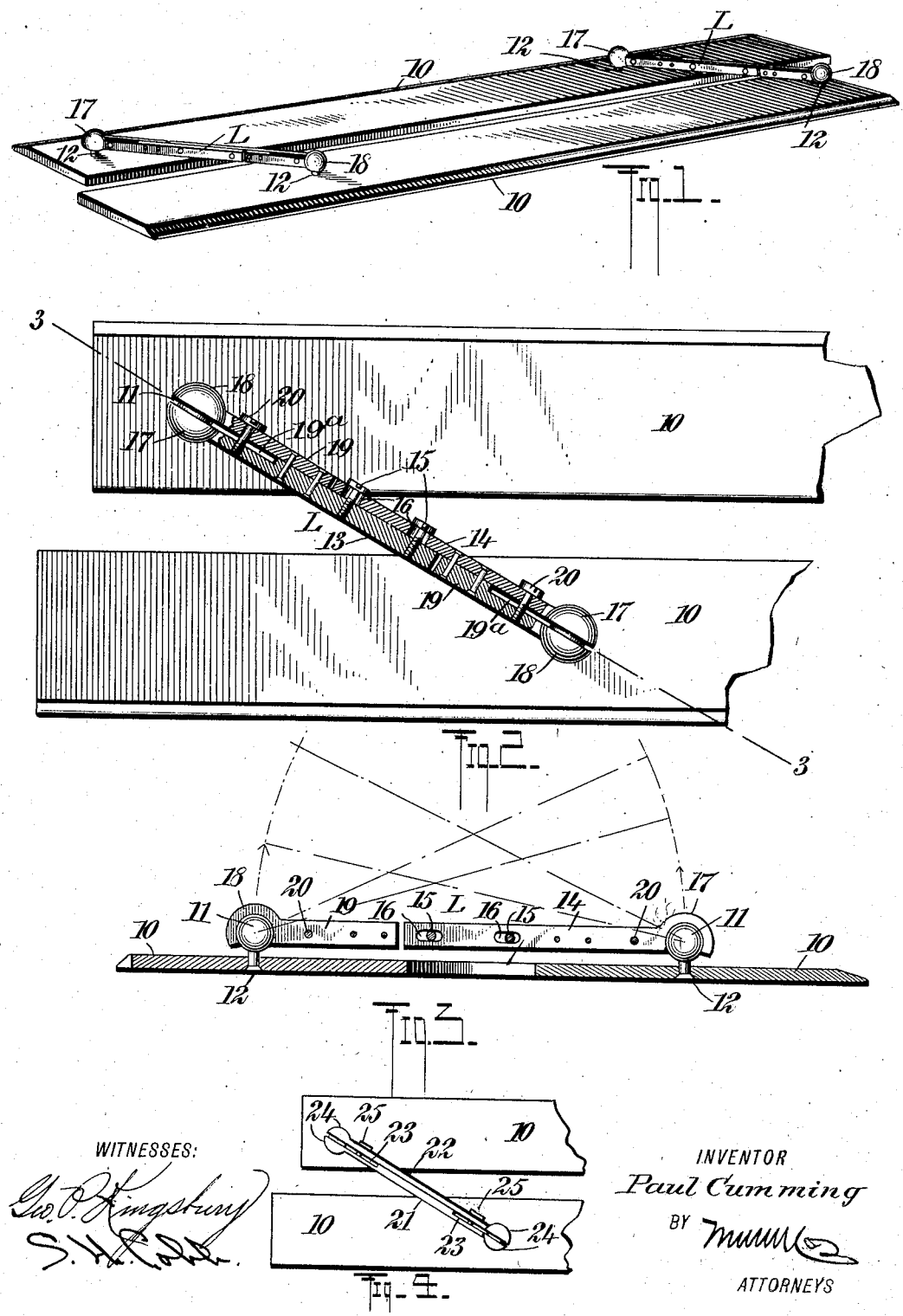

UNITED STATES PATENT OFFICE.

PAUL CUMMING, OF KEYWEST, FLORIDA.

PARALLEL-RULE.

SPECIFICATION forming part of Letters Patent No. 791,251, dated May 30, 1905.

Application filed August 23, 1904. Serial No. 221,821.

*To all whom it may concern:*

Be it known that I, PAUL CUMMING, a citizen of the United States, and a resident of Keywest, in the county of Monroe and State of Florida, have invented a new and Improved Parallel-Rule, of which the following is a full, clear, and exact description.

My invention relates to parallel-rules, its principal objects being to provide for various adjustments in such a device and for the lifting of one blade while the other remains upon the work.

It consists in the various features and combinations hereinafter described and claimed.

Reference is to be had to the accompanying drawings, forming a part of this specification, in which similar characters of reference indicate corresponding parts in all the figures.

Figure 1 is a perspective view of one embodiment of my invention. Fig. 2 is a horizontal section therethrough, taken in the plane of the links. Fig. 3 is a transverse section through the blades on the line 3 3 of Fig. 2, and Fig. 4 is a top plan view of a portion of another form of my invention.

The numerals 10 10 designate the blades of a rule, to each of which is attached a suitable number of spherical members or balls 11, (here shown as two,) they being maintained at some distance from the faces of the blades by stems 12, which may be riveted or otherwise secured near their ends. These balls are situated at different distances from each end of the rule and are connected by inclined links L, which are preferably formed in sections, of which Figs. 1 to 3 of the drawings show four. These comprise main sections or bars 13 and 14, the former having threaded openings to receive screws 15, which pass through slots 16, extended longitudinally of the bars 14. This permits these sections to be moved over one another to vary the lengths of the links, they being clamped in their adjusted position by turning down the heads of the screws into contact with the sections 14. At the outer extremity of each of the sections is shown a substantially hemispherical socket 17 to fit one of the balls, and with this is associated a similar socket member 18, having a shank 19, which may be riveted to each of the members 13 and 14 beyond the end of its companion member. Each of the shanks 19 is cut away at 19ᵃ to leave a space between the halves of the socket. Threaded into the bar 13 and into one of the shanks 19 and passing through openings in the other shank 19 and the bar 14, respectively, are screws 20 20, by which the portions of the socket may be drawn toward one another and into more or less firm contact with the balls to vary the resistance to movement.

The sockets overhang the balls somewhat to prevent disengagement, but still leave sufficient space between the outer edge of said sockets and the ball-stems to allow one of the blades to be moved vertically with relation to the other blade, which is raised, swinging about the balls of the fixed blade, the latter being held upon the work. This capability of movement of either blade with relation to the other is indicated by dotted lines in Fig. 3 and may amount to substantially forty-five degrees. The variation in the lengths of the links permits the relation of the blades to be maintained in constant parallelism, while the change in the tension or force of engagement of the socket portions upon the balls enables the wear in the joints to be taken up and any desired resistance to movement secured.

Fig. 4 shows a link having but two sections, 21 and 22, the former being of greater thickness and cut away at its ends to leave spaces at 23. Each section carries at its ends opposite hemispherical sockets 24, which may be drawn toward one another by screws 25 to vary the tension of the joints. The sections are preferably riveted together, there being no adjustment for the length of the links.

Having thus described my invention, I claim as new and desire to secure by Letters Patent—

1. A parallel-rule comprising blades, spherical members fixed to the blades, sectional links having divided sockets coacting with the spherical members, and means for adjustably securing the link-sections.

2. A parallel-rule comprising blades, spherical members fixed to the blades, sectional links having socket members coacting with the spherical members, socket members provided with shanks secured to the links, and means for adjustably securing the link-sections.

3. A parallel-rule comprising blades, spherical members fixed to the blades, links having divided ends provided with substantially hemispherical sockets coacting with the spherical members, screws extending through one of the divided ends and being threaded into its companion, and means whereby a variation in the lengths of the links is permitted.

In testimony whereof I have signed my name to this specification in the presence of two subscribing witnesses.

PAUL CUMMING.

Witnesses:
   J. M. PHIPPS,
   A. W. MORRELL.